United States Patent [19]

Sarkar

[11] Patent Number: 5,687,361

[45] Date of Patent: Nov. 11, 1997

[54] SYSTEM FOR MANAGING AND ACCESSING A DYNAMICALLY EXPANDING COMPUTER DATABASE

[75] Inventor: Shyam Sundar Sarkar, St. Paul, Minn.

[73] Assignee: Unisys Corporation, Blue Bell, Pa.

[21] Appl. No.: 387,192

[22] Filed: Feb. 13, 1995

[51] Int. Cl.⁶ .................................................. G06F 17/30
[52] U.S. Cl. ............................................ 395/601; 395/611
[58] Field of Search ................................. 395/600, 601, 395/611

[56] References Cited

U.S. PATENT DOCUMENTS

| | | | |
|---|---|---|---|
| 4,606,002 | 8/1986 | Waisman et al. | 364/200 |
| 4,677,550 | 6/1987 | Ferguson | 364/300 |
| 4,945,475 | 7/1990 | Bruffey et al. | 364/200 |
| 5,049,881 | 9/1991 | Gibson et al. | 341/95 |
| 5,058,002 | 10/1991 | Nakamura et al. | 364/200 |
| 5,201,046 | 4/1993 | Goldberg et al. | 395/600 |
| 5,218,696 | 6/1993 | Baird et al. | 395/600 |
| 5,237,678 | 8/1993 | Kuechler et al. | 395/600 |
| 5,261,088 | 11/1993 | Baird et al. | 395/600 |
| 5,283,894 | 2/1994 | Deran | 395/600 |
| 5,379,419 | 1/1995 | Hefferman et al. | 395/600 |
| 5,404,510 | 4/1995 | Smith et al. | 395/600 |
| 5,414,704 | 5/1995 | Spinney | 370/60 |
| 5,475,826 | 12/1995 | Fischer | 395/182.04 |
| 5,511,190 | 4/1996 | Sharma et al. | 395/600 |

OTHER PUBLICATIONS

Reingold et al., "Data Structure in Pascal" (Little, Brown computer systems series) pp. 300–490 Jan. 1986.
C.J. Date "An introduction to Database Systems 6th ed" (The Systems programming series) pp. 713–746 Aug. 1995.
Witobl Litwin "Virtual Hashing: A Dynamically Changing Hashing, " P (517–523) Sep. 1978.
Witold Litwin "Virtual Hashing: A NewTool For File and Table Addressing" (212–223) Sep. 1980.

*Primary Examiner*—Thomas G. Black
*Assistant Examiner*—Jean M. Corrielus
*Attorney, Agent, or Firm*—Schwegman, Lundberg, Woessner & Kluth, P.A.

[57] ABSTRACT

A database management and access system is described which provides dynamic key space allocation to one or more pages of the database as records are added to the database. The database management and access system includes a page access subsystem and a record access subsystem to facilitate record access by incorporating an order preserving, linear hashing function for cluster preservation and using empty page flags and overflow page flags to decrease range query time latencies of the database.

10 Claims, 10 Drawing Sheets

| MOST SIGNIFICANT BITS OF KEY | FUNCTION $h_d(K)$ | PAGES = $S = 2^d$ |
|---|---|---|
| – NONE – | $h_0(K)$ | 1 (NO SORT) |
| 1 | $h_1(K)$ | 2 |
| 2 | $h_2(K)$ | 4 |
| 3 | $h_3(K)$ | 8 |
| 4 | $h_4(K)$ | 16 |

*Fig. 12*

| OBJECT | NUMBER | KEY $b_4 b_3 b_2 b_1$ |
|---|---|---|
| A | 1 | 0000 |
| B | 2 | 0001 |
| C | 3 | 0010 |
| D | 4 | 0011 |
| E | 5 | 0100 |
| F | 6 | 0101 |
| G | 7 | 0110 |
| H | 8 | 0111 |
| I | 9 | 1000 |
| J | 10 | 1001 |

SYSTEM FOR MANAGING AND ACCESSING A DYNAMICALLY EXPANDING COMPUTER DATABASE

FIELD OF THE INVENTION

The present invention relates to computer databases and in particular to a page and record management system and range access system for a dynamically expanding database.

BACKGROUND OF THE INVENTION

Large databases storing vast numbers of records present difficulties for efficient data record access and management. Record access may be accomplished in highly parallel and highly sequential storage configurations. For example, hashing provides a highly parallel record access offering search time complexity O(1). On the other hand, another record storage topology, such as a binary tree, offers a binary search time complexity of (log(n)).

Therefore, for single record access hashing is faster than binary tree. However, for range access hashing is not as efficient as a binary tree range clustering scheme.

Problems also arise for storage topologies which are significantly skewed due to uneven distribution of records in the record storage topology. When record skew distorts the topology of record configuration, the resulting skewed topology may decrease the efficiency of the access method used, since the skewed topology no longer matches the intended topology of the system. For example, if a binary tree grows excessively skewed, then access of records in the longer branches requires more time than the shorter branches and access latencies are increased.

Therefore, there is a need in the art for an efficient range access system for large databases containing several records. There is a further need for a page and record management system which is dynamically expandable to minimize access latency problems due to record skew.

SUMMARY OF THE INVENTION

The present invention solves the aforementioned deficiencies of the prior art and solves other problems that will be understood and appreciated by those skilled in the art upon reading and understanding the present specification. The present invention describes a system for record management and range access in a large database. The record management and range access systems employ a page access subsystem and a record access subsystem. In one embodiment of the present invention, construction of the database is tracked by the page access subsystem to update an index of pointers as the database expands. Individual record access is provided by the record access subsystem.

In one embodiment, each record is associated with a unique key value. Construction of the database is performed by using the key value of a record to determine the appropriate page and record sequence for insertion. In one embodiment of the present invention, a record is inserted by determining the record's key value, requesting the page access subsystem to point to the appropriate page, and then invoking the record access subsystem to point to a particular record position for record insertion.

Record access is performed by providing the page access subsystem with a key value to have it point to the page of the database in which the record is stored, and then using the record access subsystem to point to the appropriate record of the database.

An order preserving, linear hashing function comprising a series of functions dependent on hash table size is incorporated into the record access subsystem to provide cluster preserved access of records. The same hashing function is beneficial to the page access subsystem in that pages are also order preserved over record key values.

In another embodiment of the present invention, range queries are performed in substantially less time than traditional searching methods by providing the page access subsystem with a series of flags to indicate empty pages. This enables a range fetch command to search for records only in nonempty pages.

In yet another embodiment of the present invention, the page access subsystem includes a series of flags to indicate overflow pages combined with a binary searching tree to perform binary search on a plurality of overflow pages.

DESCRIPTION OF THE DRAWINGS

In the drawings, where like numerals describe like components throughout the several views.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, and structural changes may be made without departing from the scope and spirit of the present invention. The following description is, therefore, not to be taken in a limiting sense and the scope of the present invention is defined by the appended claims.

System Overview

Figure 1:
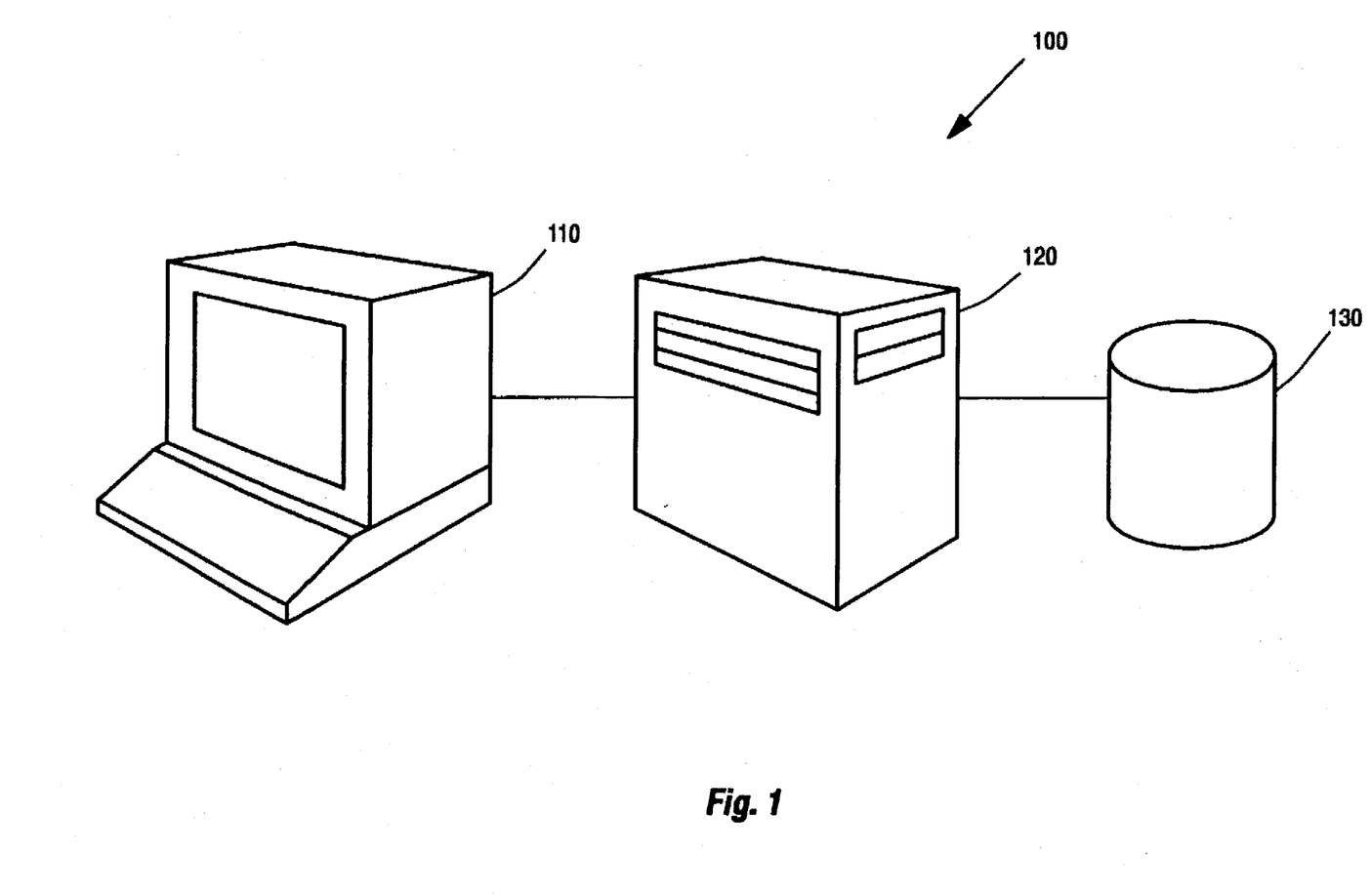
FIG. 1 shows a computer system performing record access according to one embodiment of the present invention.
Figure 2:
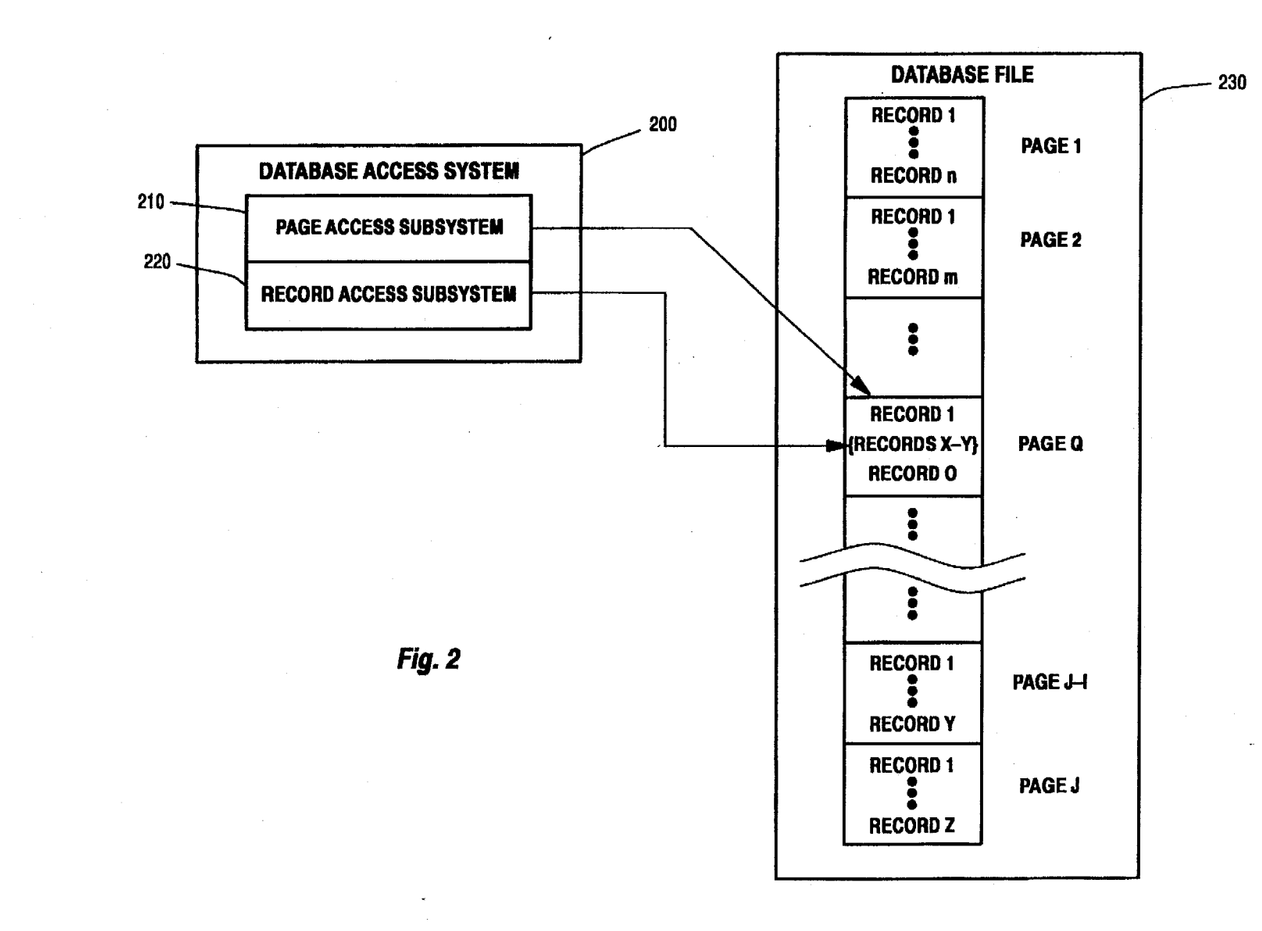
FIG. 2 shows one embodiment of a page and record management system including a page access subsystem and record access subsystem.

The present invention is a database access system for database file construction, management, and access in a large computer database. The database access system employs a page access subsystem and a record access subsystem. FIG. 1 shows a computer 100 having input/output means 110, processing and memory means 120, and mass storage means 130 for database file construction, management, and access according to one embodiment of the present invention. For example, FIG. 2 shows one embodiment of the present invention wherein a database access system 200, comprising a page access subsystem 210 and a record access subsystem 220, is used to locate a particular range of records in the database file 230. The page access subsystem 210 is used to point to a particular page of the database file 230, and the record access subsystem 220 is used to point to a particular range of records, X to Y of page Q in database file 230. The present invention provides a system for page and record access which incorporate a page access subsystem and a record access subsystem to use order preserving hashing or record key values in combination with range index tables for efficient access.

In one embodiment of the present invention, every record is associated with a unique key value. Construction of the database is performed by using the key value of a record to determine the appropriate page mad record position for insertion. A record is inserted by determining the record's key value, requesting the page access subsystem to point to the appropriate page, and then invoking the record access subsystem to point to a particular record position for record insertion.

Growth of the database is tracked by the page access subsystem to update an index of page pointers as the database expands. The pages of the database are capable of overflowing; therefore, the page access subsystem also tracks overflow pages and provides a search path for those overflow records as well.

Page Access Subsystem and Record Access Subsystem Using Order Preserving, Linear Bit Hashing In one embodiment of the present invention record keys are mapped to a set of integers in monotonically increasing order. Additionally, an order preserving, linear hashing function comprising a series of functions dependent on hash table size is incorporated into both the page and record access subsystem to provide record order preservation (and therefore cluster preservation) during storage and access of records. Such functions allow expansion of the database without having to reorganize the key mapping and hashing functions. This order preserving, linear hashing function is beneficial to the page access subsystem in that page address space is uniformly expanded and contracted.

One such order preserving, linear bit hashing function is comprised of a series of functions $h_i(k), i=0, 1, \ldots$, which maps the key space K into the integers $0, 1, \ldots, 2^{(i-1)}$ such that for any k belonging to K either:

$$h_i(k) = h_{(i-1)}(k)$$

or $$h_i(k) = h_{(i-1)}(k) + 2^{(i-1)}$$

This function describes a bit hashing function which the next higher order hashing function is a binary expansion of the previous order hashing function, which provides an order preserving, linear bit hashing relationship between succeeding hashing functions to facilitate expansion of the hashing table without destroying the order preservation of the elements stored in the table. There are many bit hashing functions which satisfy the function $h_i(k)$.

Assume that a database with a key space K is being constructed with z records, such that $0 \leq z \leq K$. Assume that page size is a constant and is predetermined by the operating system of computer 100. Then a page can hold additional records until the page limit is exceeded by storage of another record, since the page stores a record if the page memory is exceeded by storage of that record. Those skilled in the art will readily recognize that other computer systems may allocate different memory sizes to particular pages; however, this discussion is limited to a fixed page size for illustration purposes and is not intended in a limiting or exclusive sense. Therefore, the number of records stored on a particular memory page is a function of the page size and the size of each record stored in the page.

Whenever a page size limit is reached either the tree must grow or extra records must be stored in overflow pages without being merged directly into their appropriate page. The present invention provides for database expansion by expanding the data space as linear concatenations of the existing data space, while simultaneously accounting for the expansion using the page access subsystem. Reallocation of the key space to accommodate the expansion of the data space is automatically accomplished using the order preserving, linear bit hashing function series in the record access subsystem. As stated earlier, there are many bit hashing systems which satisfy the function $h_i(k)$. One such system is described in the following example.

One Embodiment of an Order Preserving, Linear Bit Hashing System

Assume that a collection of data records, $\overline{\Pi}$, is awaiting storage in a database capable of storing K records. Assume also that each page has a page memory limit and that none of the records individually exceed the page memory limit. Each record can be assigned a monotonically increasing key integer. Then the key space is K and a hashing function is needed to map the key space to the data space as the database grows.

One bit hashing function $h_d(k)$ which satisfies the above conditions is a function which sorts records using d most significant bits of the key to distribute records to $s=2^d$ data pages. The function takes d bits to create s pages; however, the function reverses the order of the d bits before allocating the appropriate records. The bit reversal is performed to maintain order and cluster preservation of the files. Therefore, additional bits must be bit hashed for increasing record distribution.

Growth of the database is performed according to the above hashing function where pages are "split" as they fill. In other words, after a page is full, the available data space for storing records can be doubled by allocating only the first K/2 keys to the first data page and designating the second K/2 keys to a "buddy" page which is a linear concatenation of memory space to the first data page. The records in the first page are then redistributed between the first page and the buddy page.

Therefore, a "split pointer" is used to point to the last page which has not been split. Recall that a particular order bit hashing function bit hashes d bits which correspond to s pages. After each page split the split pointer is incremented to the next page. When the split pointer reaches the end of the last page of the data space designated by the current hashing function (the "sth" page) then a next higher order hashing function is required ($h_d+1$) which enables further splitting of the key space among the existing and new data pages. This means that another higher order bit is required for the hashing series and allows the system to grow with the memory demand of the records being added to the database.

The page access subsystem simultaneously tracks the ranges associated with each data page as the tree grows. The page access subsystem creates tree of range index pages which ultimately point to the correct data page for a given range of records.

Figure 3:
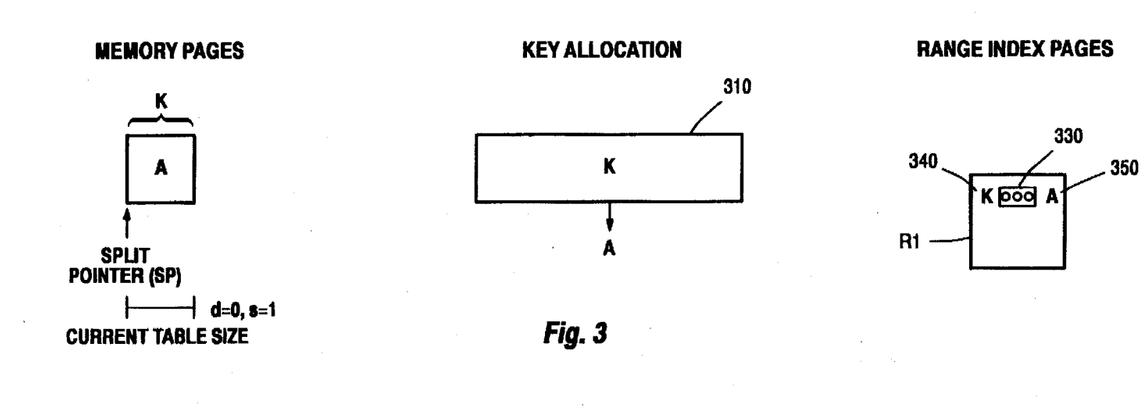
FIGS. 3, 4, 5, 6A, 6B, 7, 8, 9, 10A, 10B, 11, 12, and 13 illustrate the growth of a database in a computer memory under one embodiment of the present invention; also shown are the relative keyspaces and index pages for each expansion of the database.

For example, assume $d=0$. This means that the $s=2^0=1$, or that all the records $\overline{\Pi}$ are stored in a first page of memory which is shown in FIG. 3 as page A. As shown in FIG. 3, page A is a first data page in memory of computer 100 (most commonly in mass storage 130). Those skilled in the art will readily recognize that this first data page (A) is not necessarily the first absolute page of memory storage, since it is possible that a file control page or other data structure occupy the first page of memory storage in a database (i.e., this is a logical page numbering and not to be construed as an absolute page numbering).

FIG. 3 shows that the current hash table size is $s=1$, and shows a split pointer ("sp") at the beginning of the table. The split pointer indicates the page which will next be split. Therefore, page A may split when it fills, since the split pointer is not yet at the end of the hash table (end of page A).

FIG. 3 also shows the key space allocation with respect to the memory pages in the database (box 310). In this case, the entire key space K is coincident with page A. FIG. 3 also shows the page access subsystem's entry as a root range index page R1. Page R1 shows the first entry into the page as mapping the first K keys (i.e., all of the keys in $\overline{\text{II}}$) to page A of memory by using range 340 and its associated page pointer 350. Therefore, a range access of any key value will automatically be referred to page A by pointer 350. Status flags 330 indicate whether the page pointer 350 is pointing to a page which is empty or in overflow. Those skilled in the art will readily recognize that other parameters related to the page of interest (e.g., the page pointed to by page pointer 350) may be represented by flags 330, and the demonstration of certain flags is not intended in a limiting or exclusive sense. Operation of the empty and overflow flags will be discussed below, and the empty and overflow flags are omitted from subsequent figures to reduce the complexity of the drawings.

Figure 4:
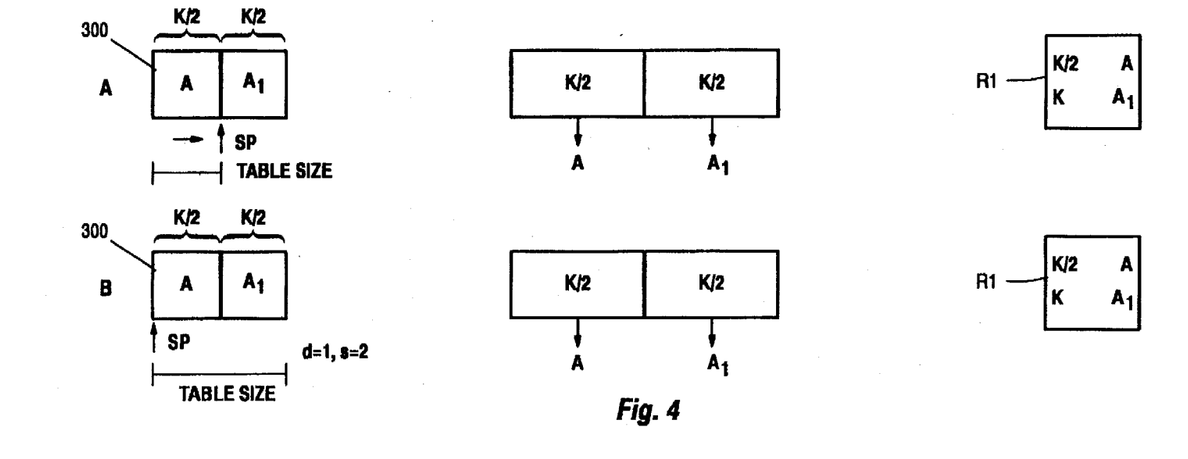

The growth of the database according to one embodiment of the present invention is demonstrated by assuming that the records inserted into page A of the database have filled the page and that a split is necessary to continue adding records to the database. In that case the record to be stored is temporarily stored in an overflow data page (not shown) and a buddy page to the current page (the page pointed to by the split pointer, or in this case, page A) is added to the database as a linear concatenation of the last page in the database, as shown by page $A_1$ in FIG. 4A. After the buddy page $A_1$ is created, the split pointer (sp) is incremented. However, this results in the split pointer reaching the end of the current hash table (d=0, s=1), so the sp is returned to the beginning of the table and the order of the current hash table is incremented $h_1k(d=1, s=2)$, as shown in FIG. 4B. For all practical purposes, the events in FIGS. 4 A and B happen simultaneously; however, these events were shown separately to illustrate the functioning of this particular series of order preserving, linear hashing functions.

As shown in FIG. 4B, the result is that the key space is split between the original page A and its buddy page $A_1$. The page access subsystem also updates its range index page to reflect the new mapping of the key space to memory space. As is seen from page R1, the first half of the key space ($1 \leq \text{range } A \leq K/2$) is the range associated with page A, and the second half of the key space is allocated to the second page of the database, $A_1(K/2 < \text{range } A_1 \leq K)$. After the buddy page is constructed and the next order hashing function is established, the records in page A and the record temporarily stored in the overflow page are redistributed between page A and page $A_1$ according to the $h_ik$ (d=1, s=2) hashing function. The memory size of page A is not affected by reducing the number of keys associated with it.

Figure 5:
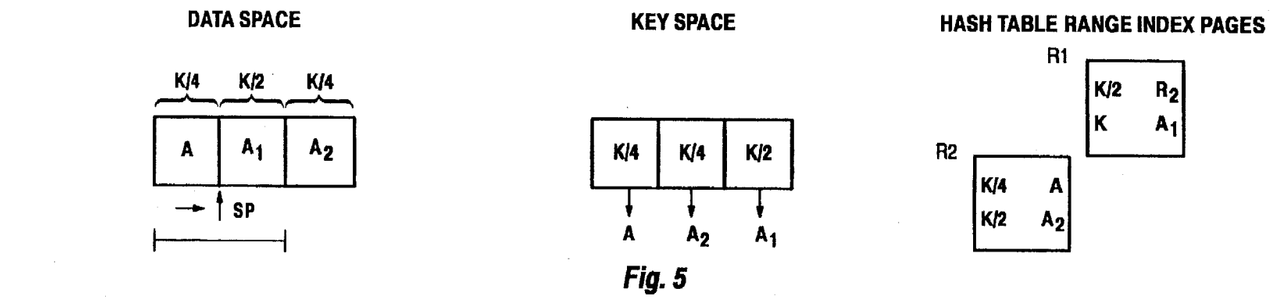

Further expansions are demonstrated in FIGS. 5, 6A, 6B, 7, 8, 9, 10A, and 10B. Another assumption will be made to demonstrate growth of the range index tree by the page access subsystem. For demonstration purposes it will be assumed that the maximum number of entries per range index page is two. Therefore, growth of the range index tree is readily observable from the following expansions. Those skilled in the art will readily recognize that more entries are possible without departing from the scope and spirit of the present invention and the example using two records is not intended to be limiting or exclusive. Referring to FIG. 5, a buddy page of A is again created and labeled as $A_2$ to indicate that it is the second buddy page of A (recall, the first buddy page was $A_1$. The split pointer is incremented to the next page; however, another expansion is unnecessary, since the split pointer is not to the end of the hash table (since a buddy page for $A_1$ can still be created if necessary). The range index tree is modified to account for the new buddy page $A_2$ by adding a second range access page R2. Range accesses for key values less than K/2 are pointed to page R2 by the page pointer in R1 for $1 \leq \text{range} \leq K/2$. Therefore, the range $1 \leq \text{range} \leq K/2$ is segmented into two ranges: $1 \leq \text{range} \leq K/4$, with page pointer A; and $(K/4)+ 1 \leq \text{range} \leq K/2$, having page pointer $A_2$, because of the entries in R2. Similarly, accesses for greater than K/2 are referred to page $A_1$ by R1 (as in the previous case shown in FIG. 4).

It should be noted that even though the data pages A and $A_2$ are not contiguous in physical memory, they are, however, contiguous to the database page access subsystem since if a range access exceeds the A page it immediately accesses the next record from the $A_2$ page by virtue of the range index tree, and in particular, R2. This is graphically demonstrated by the key space drawing showing A and A2 contiguous in key space, despite the fact that they are not contiguous in logical memory space. This is accomplished as a direct result of the order preserving, linear bit hashing function applied to generate the hash table (represented in data space) and the range index table.

Figure 6A:
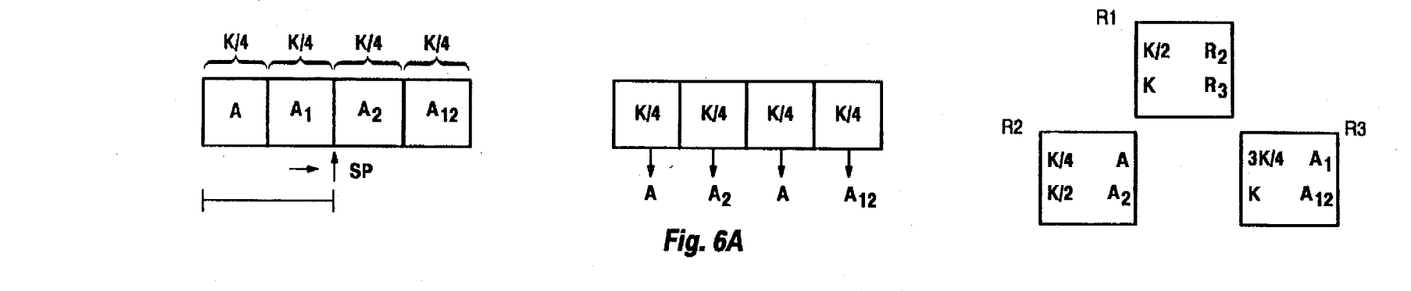
Figure 6B:
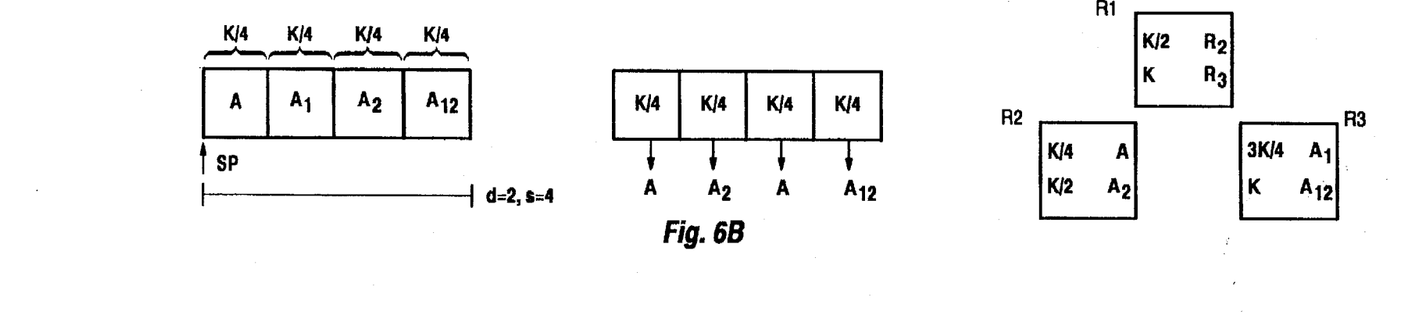

Referring now to FIGS. 6A and B, the next page insertion results in an incrementing of the split pointer and a wrap around of the pointer due to the pointer reaching the end of the hash table $h_1k$ (d=1, s=2). As in the previous example shown in FIG. 4, as the split pointer reaches the end of the hash table, it is reset and the next higher order hashing function is invoked for continuing expansion of the table. After this expansion is completed it is important to observe that all entries in page R1 of the range index pages now refer to secondary range access pages R2 and R3 and that essentially all of the necessary information for range access lies in the secondary pages R2 and R3, so that R1 may be discarded without losing range access information.

Referring now to FIGS. 7, 8, 9, 10A, and 10B, the remaining expansion of the data space, key space, and range index tree is straightforward. The next time the split pointer will wrap around is shown in FIG. 10, when the next higher order linear hashing function is d=3, s=8. Further expansions are possible to the extent of the data space (or the key space) and are readily performed by repeating these steps.

Figure 10A:
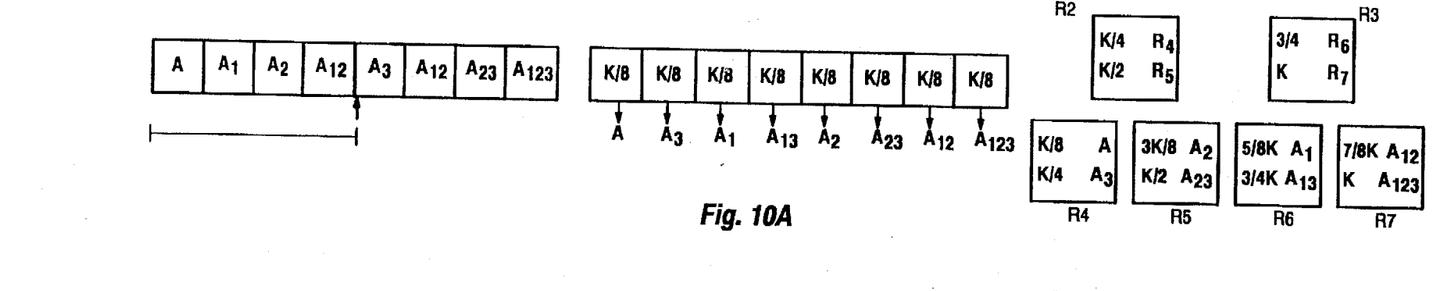
Figure 10B:
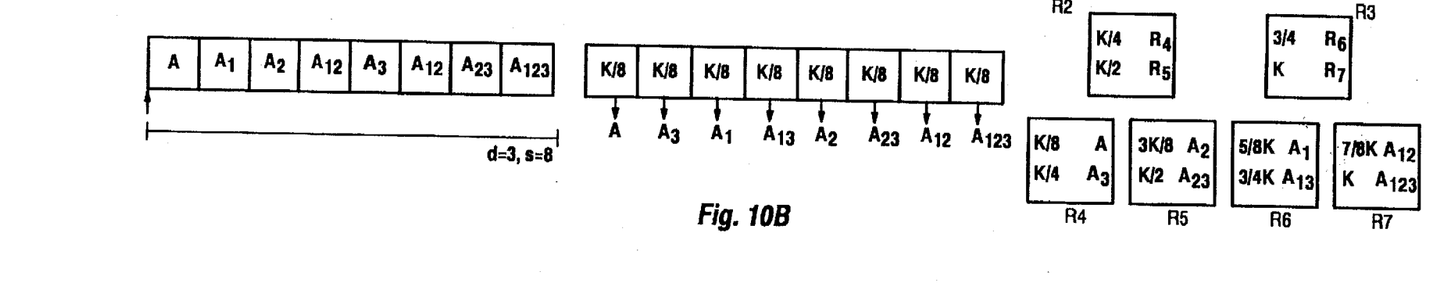

Of particular importance is the fact that in FIG. 10A the significant range access information is present in R4, R5, R6, and R7. In addition, this allows for discarding R2 and R3, since they may be reproduced from the information in R4–R7. Additionally, future expansions of the table only require R4–R7. This is important, since elimination of lower order range pages may reduce the overall range search time by skipping upper level index pages. Additionally, total memory space required by this embodiment of the present invention is decreased.

Figure 11:
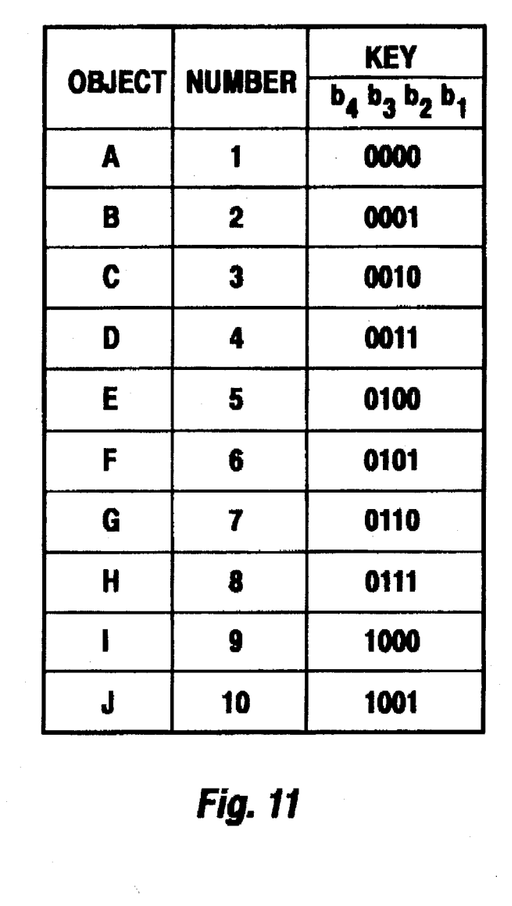
Figure 12:
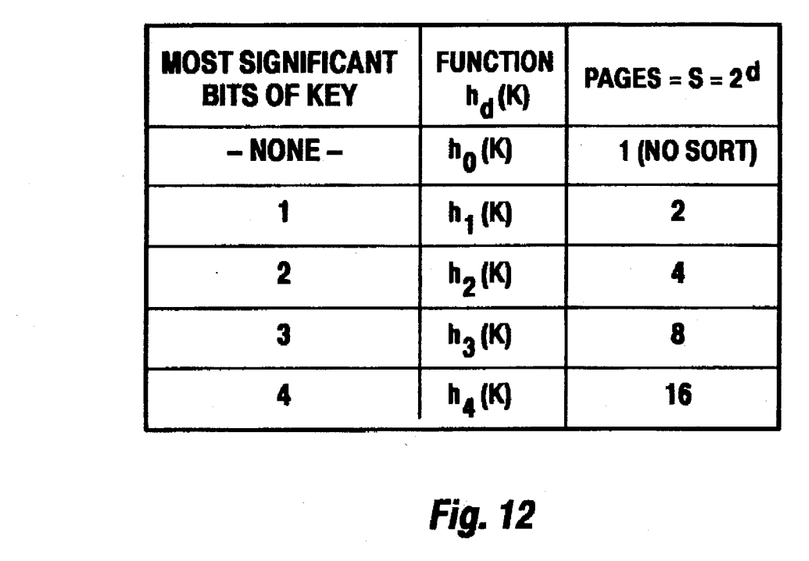
Figure 13:
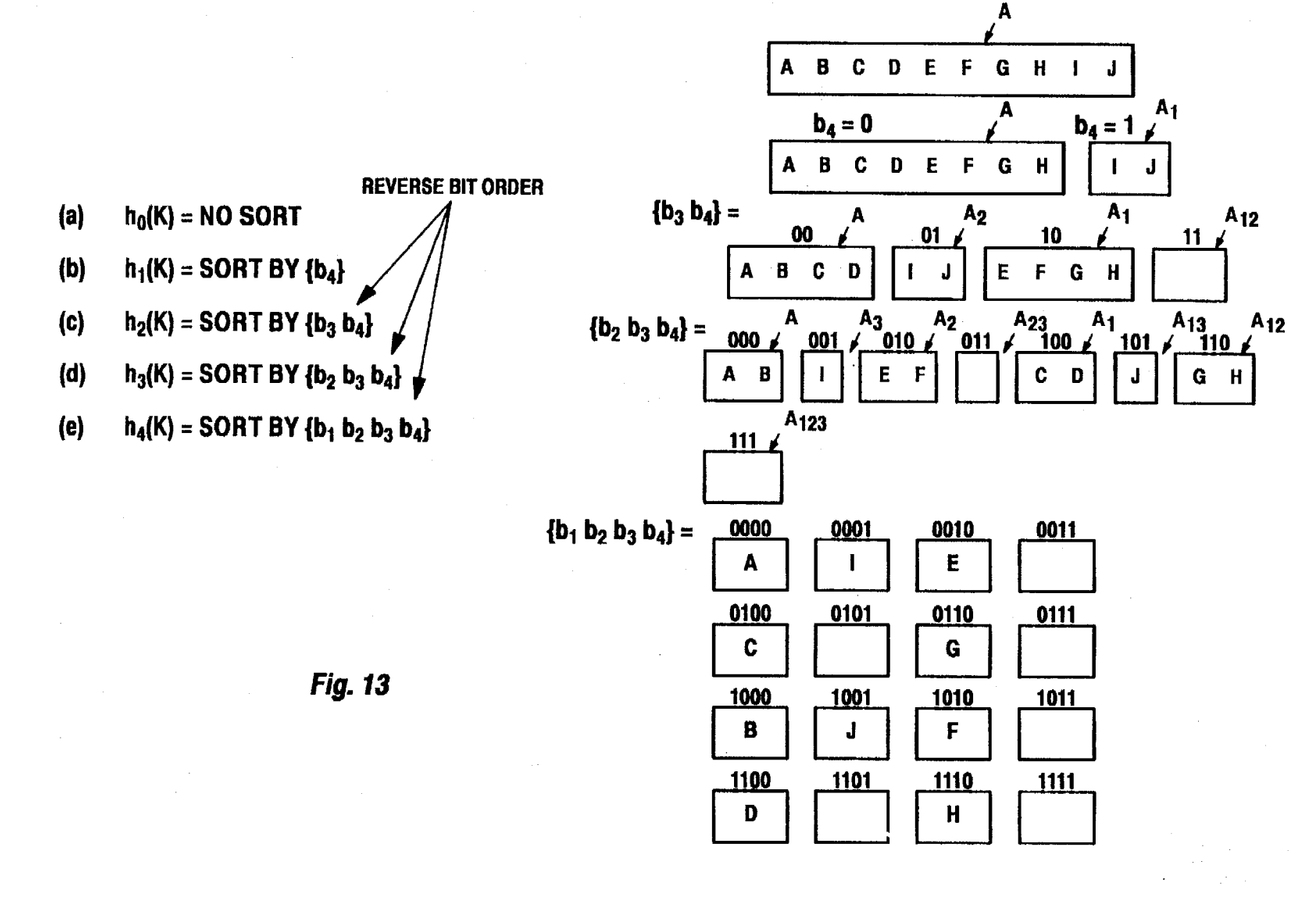

Example of Record Distribution According to One Embodiment of the Present Invention Assume a collection of data records, A–J, which are assigned monotonically increasing binary key values as shown in FIG. 11, must be distributed to a number of pages in a database. One hashing function $h_d(k)$ which satisfies the above conditions is a function which sorts using d most significant bits of the key to distribute records to $s=2^d$ data pages. The function takes d bits to create s pages; however, it reverses the order of the d bits before allocating the appropriate records. The bit reversal is performed to maintain order and cluster preservation of the files. Therefore, additional bits must be bit hashed for increasing record distribution, as demonstrated in FIG. 12.

FIG. 13(a)–(e) shows the mapping for the ascending ordered functions $h_d(k)$ using this particular bit hashing function. Note that order preservation is maintained not in the data space as shown in FIG. 13, but in the key space which is rearranged by the range index pages constructed for each expansion. Where possible, page designations from the preceding expansions were assigned to the data segments in the mapping. One skilled in the art will readily recognize that several other order preserving, linear bit hashing functions are possible, and that the function demonstrated is not intended in an exclusive or limiting sense.

Empty and Overflow Flag Signalling

In one embodiment of the present invention, range queries are performed in substantially less time than traditional searching methods by providing the page access subsystem with a series of flags to indicate empty pages. This enables a range fetch command to search for records only in non-empty pages.

Figure 14:
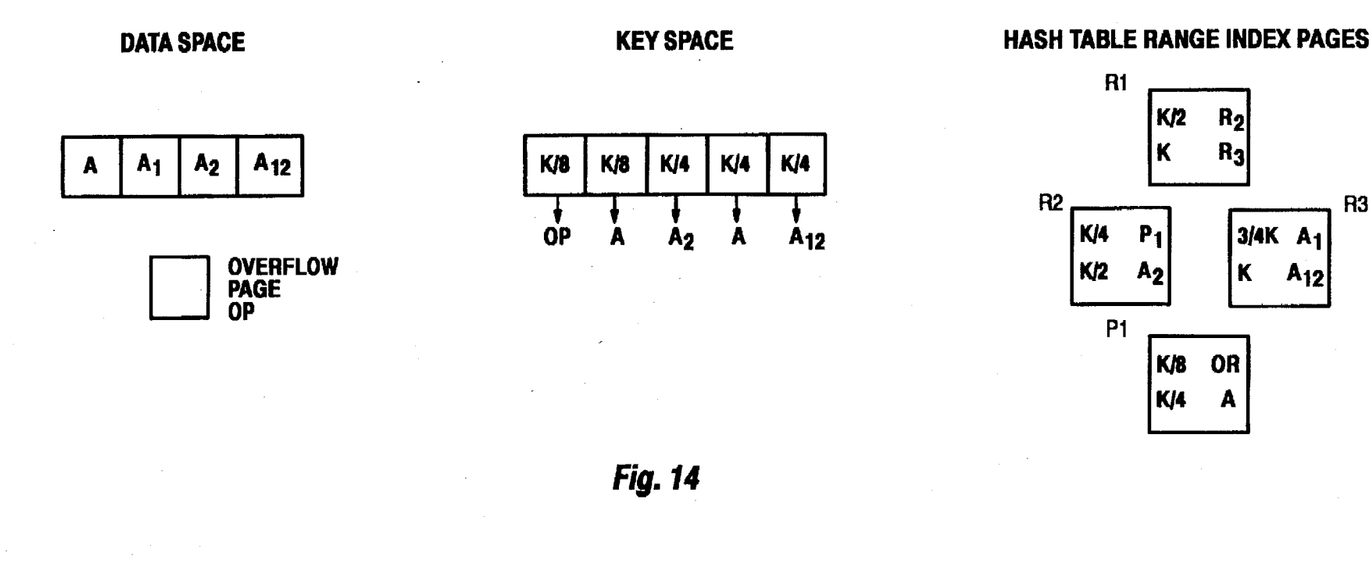
FIG. 14 illustrates overflow handling according to one embodiment of the present invention.

In another embodiment of the present invention, the page access subsystem includes a series of flags to indicate overflow pages combined with a binary searching tree to perform binary search on a plurality of overflow pages. FIG. 14 alters the example shown in FIG. 6A to illustrate an overflow condition. In this example, an overflow occurred in page A, requiring an overflow index page P1 to contain the page pointers for both the A page and the overflow page OP which was added to handle the overflow until the next expansion redistributes the records. The resulting impact on key space is shown as well. One of the advantages of this method is that binary search can be performed on any number of overflow pages resulting from the storage of records to the database. This feature reduces search time in overflow pages. Those skilled in the art will readily recognize that several overflow index pages could be added to this structure without departing from the scope.

In another embodiment of the present invention, the database is decreased by page deletion according to the same order preserving, linear hashing function series.

One skilled in the art will readily recognize that the hash table expansions demonstrated in the specification are not intended in a limiting sense and that the database can extend several orders higher without departing from the scope and spirit of the present invention. The figures only demonstrate one example and are not intended to be exclusive or limiting.

Figure 15:
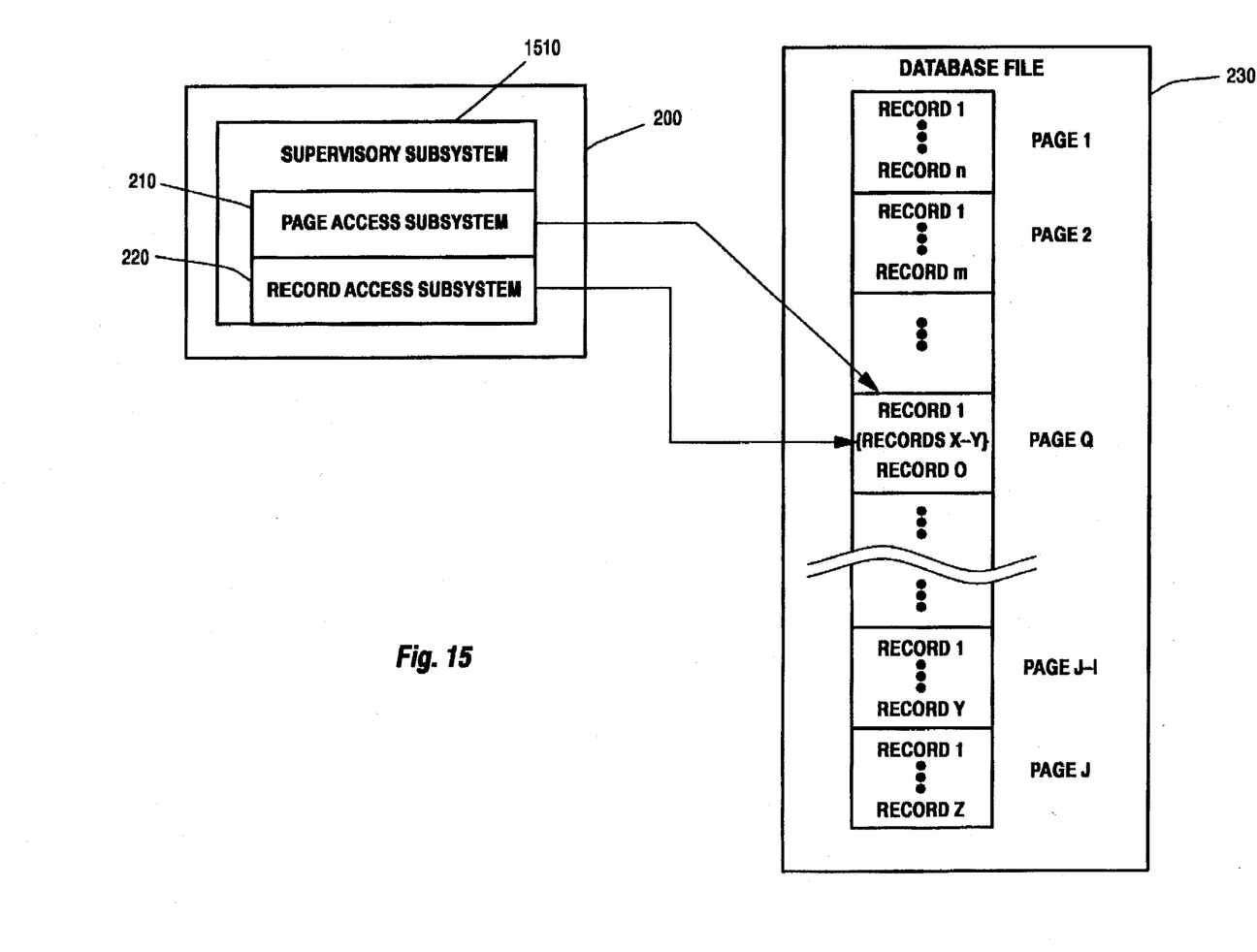
FIG. 15 shows one embodiment of a page and record management system including a supervisory subsystem, a page access subsystem, and a record access subsystem.

FIG. 15 shows another embodiment of the present invention including a supervisory subsystem 1510 which controls the growth of the database to ensure that a minimal number of pages are in use as records are added and deleted from the database. The supervisory subsystem minimizes database skew by merging pages when the buddy page is no longer necessary.

Figure 7:
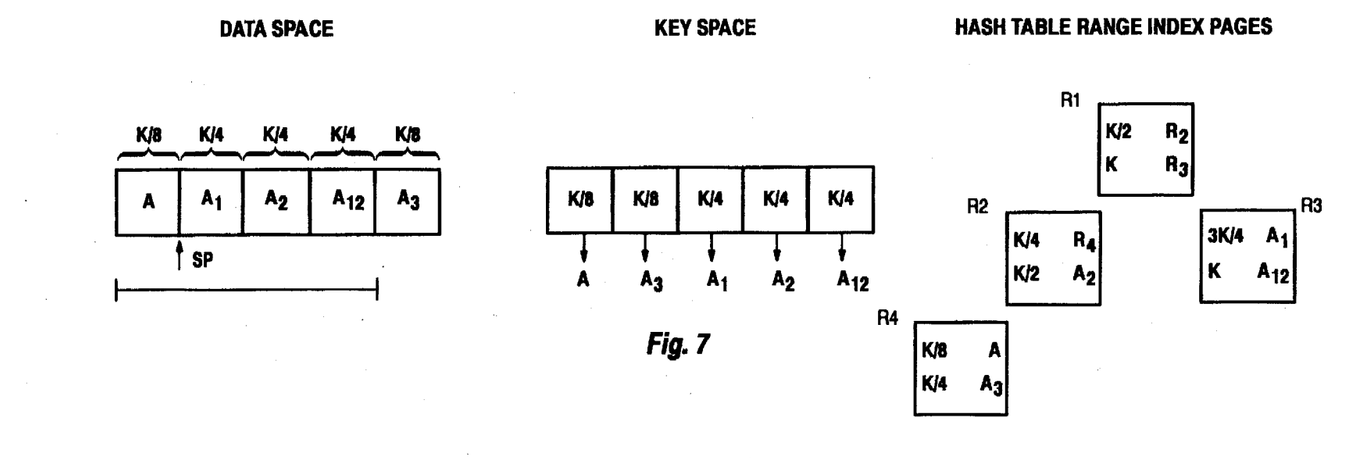
Figure 8:
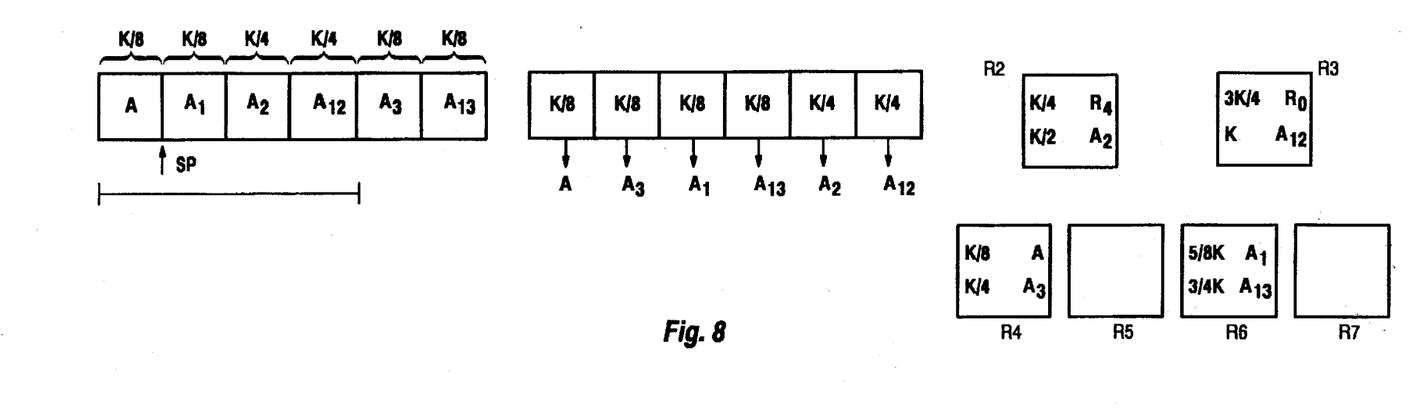
Figure 9:
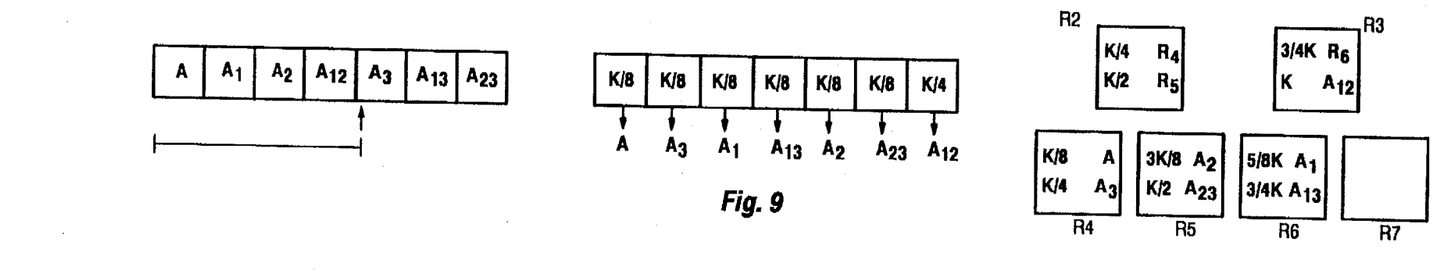

In the previously described embodiments, pages are added as necessary to accommodate new record insertions to the database. However, in this embodiment as records are deleted from the database the hash table condenses as pages are no longer needed. For example, suppose records are added to a database, resulting in a hash table as shown in FIG. 8. Further assume that some records are deleted from the database so that the records stored on page $A_1$ and its second buddy page $A_{13}$ could be stored on page $A_1$ alone. This would allow pages $A_1$ and $A_{13}$ to be merged into one page containing all of the records in pages $A_1$ and $A_{13}$ and buddy page $A_{13}$ could be deleted to eliminate unnecessary pages from the database, resulting in the hash table shown in FIG. 7.

The supervisory subsystem is designed to monitor record insertions and deletions in the database to ensure that the database merges pages when possible. In one embodiment, the supervisory subsystem tracks the sizes of records stored in each page and monitors the last page split and its buddy to determine if condensation is appropriate. For instance, in the hash table of FIG. 8 the split pointer is pointing to page $A_2$; therefore, the supervisory subsystem will monitor the amount of data space required by pages $A_1$ and $A_{13}$ to determine if these pages should merge. If enough records have been deleted to allow the merge, then the records in page $A_{13}$ are stored in page $A_1$ and the hash table index pages are updated to remove the references to page $A_{13}$. The split page pointer is also decremented by one, and the resulting database is shown in FIG. 7. Therefore, under this embodiment, the hash table (data space) condenses in the same way it grows.

Therefore, once the split pointer reaches the first page of the hash table, a next lower order hashing function $h_{d-1}(k)$ will be used to redistribute the records to the pages as the database condenses.

One skilled in the art will readily recognize that the database can dynamically expand or condense using this embodiment of the present invention. The above example was offered to illustrate only one way in which the database can expand and condense and is not intended in a limiting or exclusive sense. One skilled in the art will readily recognize that this method is applicable to the database at any level hash table and that multiple contractions of the database or any sequence of expansions and/or condensations are possible without departing from the spirit and scope of the present invention.

Another embodiment of the supervisory subsystem 1510 includes order reduction of the database. If a sufficient number of records are deleted from the database such that the next lower order preserving, linear hashing function $h_{d-1}(k)$ provides adequate page space then the records in the existing database can be redistributed to $s=2^{d-1}$ pages using the $h_{d-1}(k)$ hashing function as previously described in earlier embodiments. This occurs when every buddy page of a particular order becomes unnecessary due to a number of deleted records distributed throughout the physical memory. Essentially, the same process as described in the last embodiment is recursively applied to next lower order hashing functions to condense the database by a complete order whenever possible.

For example, referring now to FIG. 8, suppose that pages $A_1$ and $A_{13}$ could not merge, since the combination of the records would not all fit on page $A_1$. Although not necessarily true, it is still possible that the database could be condensed, since there may exist enough empty records in A, $A_2$, $A_{12}$, and $A_3$ to allow a condensing of the database to the $h_1(k)$ order hashing function distribution (as shown in FIG. 6A), even though the test on the last buddy page $A_{13}$ is not satisfied. The supervisory module totals the memory space needed by the records in each buddy page of that order (in FIG. 8, this means the buddy pages $A_3$ and $A_{13}$) and adds them with the memory space of the records in their respective lower order split pages (pages A and $A_1$ in FIG. 8) to determine if the lower order split pages can accommodate all of the records. If so, then the $h_2(k)$ expansion of FIG. 8 can be condensed into the $h_1(k)$ expansion of FIG. 6A and redistribution according to the $h_1(k)$ hashing function is possible.

Note that this method may be recursively applied using lower order hashing functions to condense the database should the records be concentrated at the end of the physical memory space. Therefore, if the first test is not satisfied, subsequent lower order tests may prove adequate to condense the database.

Other embodiments may be incorporated which dynamically adjust the page size to facilitate the particular records stored in the database. Changing the page size essentially changes the number of ranges to search. To illustrate the extreme cases, a very large page size would result in only one range. As the page size decreases, several more pages split with their associated ranges. Therefore the page size acts as a tuning adjustment for the space of individual ranges to search in the database.

Those skilled in the art will readily recognize that the embodiments described herein were offered for demonstration purposes and are not intended in a limiting or exclusive sense. Other embodiments are possible which will not deviate from the spirit and scope of the present invention.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

I claim:

1. In a computer system, a method of record management to provide range access in a hash table for a computer database, comprising the steps of:
   (A) assigning a key value to each record to be stored in the hash table;
   (B) constructing the hash table having a hash table size, S, by the steps including:
      (1) hashing records using the key value to one or more pages of memory using an order preserving, hashing function, which is a function of the hash table size, S;
      (2) setting a split pointer to a first page of the hash table;
      (3) updating a range index tree as pages of memory are added or deleted, the range index tree including one or more pages containing a list of ranges and an associated list of page pointers which are entered in range order as the hash table is modified;
      (4) storing records to one or more pages of the hash table according to the hashing function of step (B) (1), wherein for a particular record hashed to a particular destination page, the step of storing includes the steps of:
         (a) if the particular destination page contains enough memory to store the particular record, then storing the particular record in the particular destination page;
         (b) if the particular destination page does not contain enough memory to store the particular record, then storing the particular record in an overflow page and updating the range index tree to point to the overflow page;
         (c) splitting an unsplit page pointed to by the split pointer, by the steps including:
            (i) reallocating a key space of the unsplit page to both the unsplit page and a buddy page to form an unsplit key space and a buddy key space;
            (ii) reallocating records of the unsplit page and the overflow page to the unsplit page and the buddy page according to the unsplit key space and the buddy page key space;
            (iii) incrementing the split pointer to a next page in the hash table;
            (iv) if the split pointer points to the Sth page of the table,
   then
            a. reset the split pointer to the first page of the hash table; and
            b. hash future records according to a next level hashing function; and (v) updating the range index tree to store the unsplit page key space and the buddy page key space.

2. In a computer system, a method of record retrieval using range access in a hash table for a computer database having a range of records including a first record and a last record, comprising the steps of:
   (A) using a key value associated with the first record to determine a range in which the first record is stored;
   (B) locating the range in a range index tree by the steps of:
      (1) hashing to a lowest level index page in the range access tree;
      (2) retrieving a page pointer to a page associated with the range;
      (3) reading a flag from a page designating empty ranges;
      (4) skipping empty ranges and fetching non-empty pages in the hash table;
      (5) repeat steps (2),(3), and (4) until reading a last page; and
   (C) locating the first record by performing a binary search on a fetched page; and
   (D) locating subsequent records by sequentially searching fetched pages.

3. The method of claim 2 wherein the step of fetching non-empty pages further comprises the step of performing a binary search on a portion of the range index tree having overflow index pages to access overflow pages.

4. A method for distributing a plurality of records to one or more pages in a hash table, comprising the steps of:
   (A) assigning a key value to each record of the plurality of records;
   (B) selecting a hashing function for the keys of the records, wherein the hashing function is an order preserving, linear hashing function, which is constructed using a series of functions dependent on hash table size; and
   (C) distributing records to pages of the hash table according to the hashing function, comprising the steps of:
      (1) initializing the hash table, including the steps of:
         (a) pointing to a current page of the hash table using a split pointer;
         (b) creating a first page of the hash table;
         (c) setting the split pointer to the first page of the hash table;
         (d) setting a level counter to zero;
         (e) creating a hash table range index page, wherein the hash table range index page stores a list of ranges and a list of page pointers, and wherein a single range in the list of ranges is associated with a single page pointer in the list of page pointers;
         (f) storing in the list of ranges a first range containing a maximum range of key values; and
         (g) storing in the list of page pointers a first pointer for pointing to the first page;
      (2) constructing the hash table, comprising the steps of:
         (a) choosing a record from the plurality of records and its associated key value;
         (b) hashing to a destination page according to the level counter and split pointer, the destination page having a destination page range and a destination page pointer in the hash table range index page;
         (c) determining a storage limit for the destination page; and
         (d) storing the record in the destination page, including the steps of:

(i) if adding the record to the destination page would not exceed the storage limit, storing the record in the destination page;

(ii) if adding the record to the destination page would exceed the storage limit:

a. storing the record in an overflow page, including the steps of:

1. creating an overflow index page to point to the overflow page;

2. setting page pointers in a previous hash table range index page to point to the overflow index page; and         3. setting an overflow flag in the hash table index page to indicate overflow of the destination page;

b. constructing a buddy page to the current page, wherein the buddy page is a linear concatenation to the hash table;

c. redistributing records in the overflow page, the current page, and the buddy page, according to a (level counter+1)th hashing function of the series of functions;

d. updating the hash table range index page, including the steps of:

1. locating the destination page range and destination page pointer in the hash table range index page;

2. splitting the destination page range into two equal ranges, comprising a first range and a second range, wherein the first range is associated with the destination page pointer and the second range is associated with a buddy page pointer;

3. replacing the destination page range with the first range and inserting the second range and buddy page pointer immediately thereafter in the hash table range index page; and         4. if the destination page has no records, then setting an empty flag in the hash table range index page to indicate the destination page is empty;

e. incrementing the split pointer; and f. if the split pointer points to the last page of the hash table:

1. setting the split pointer to the first page of the hash table; and         2. incrementing the level counter; and (3) returning to the step of choosing a record until all records have been added to the hash table.

5. The method of claim 4 wherein the step of creating a hash table range index page comprises the steps of:

if the hash table range index page is full, creating a second hash table range index page;

referencing the second hash table range index page in the original hash table range index page; and storing subsequent ranges and pointers in the second index page.

6. The method of claim 4 further comprising the steps of:

removing the record from the destination page; and if the destination page is empty, setting an empty flag in the hash table range index page.

7. A database management and access system for a computer database, comprising:

(A) page access means for pointing to a particular page from a given key value;

(B) record access means for pointing to a particular record from the given key value;

(C) overflow page generation means for storing overflow data; and (D) empty page flagging means for eliminating empty pages from range queries of the computer database.

8. The database management and access system of claim 7 further comprising an overflow page flagging means for binary search of overflow pages during range queries of the computer database.

9. The database management and access system of claim 7 further comprising supervisory means for controlling database condensation.

10. A method for managing a plurality of records in a database in a computer system, comprising the steps of:

(A) setting a page size;

(B) assigning a key value to each record in the plurality of records;

(C) inserting records into the database by the steps of:

(1) hashing records into destination pages according to an order preserving, linear hashing function, by the steps including:

(a) if the destination pages have memory space to store the records, storing the records in the destination pages according to the order preserving, linear hashing function; and         (b) if the destination pages do not have memory space to store the records, storing the records in overflow pages according to the order preserving, linear hashing function and storing ranges of overflow key values and associated overflow page pointers in overflow index pages;

(2) storing ranges of key values and associated page pointers in hash table range index pages;

(3) setting empty flags for ranges which are empty; and

(4) setting overflow flags for ranges with overflow pages;

(D) deleting records of the database by the steps of:

(1) removing references to deleted records of the database;

(2) eliminating empty pages and unnecessary buddy pages of the database;

(3) redistributing records into pages according to the order preserving, linear hashing function to condense the database; and     (4) adjusting ranges of key values and page pointers in the hash table range index pages according to the database after condensation; and (E) accessing records of the database by the steps of:

(1) performing page access using the hash table range index pages and the overflow index pages to obtain one or more page pointers, wherein page access uses the empty flags and the overflow flags to accelerate access; and     (2) performing record access by fetching records hashed according to the order preserving, linear hashing function.

* * * * *